P. H. HORWITT.
DISPENSING APPARATUS.
APPLICATION FILED FEB. 4, 1922.
1,434,057.
Patented Oct. 31, 1922.
7 SHEETS—SHEET 1.
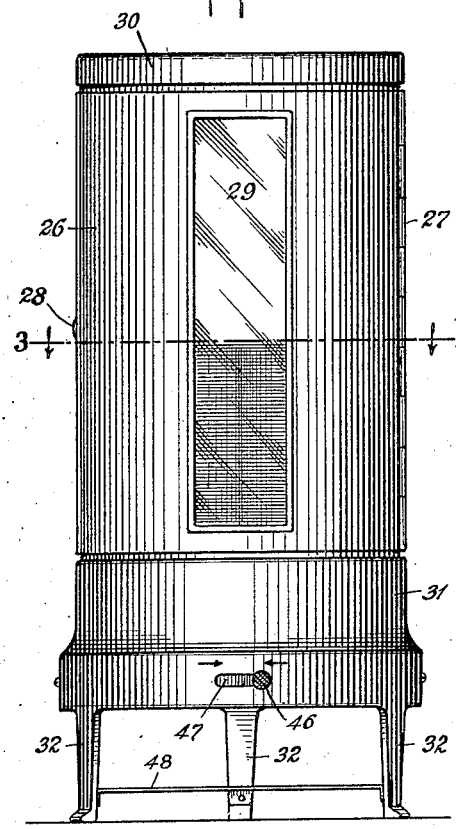
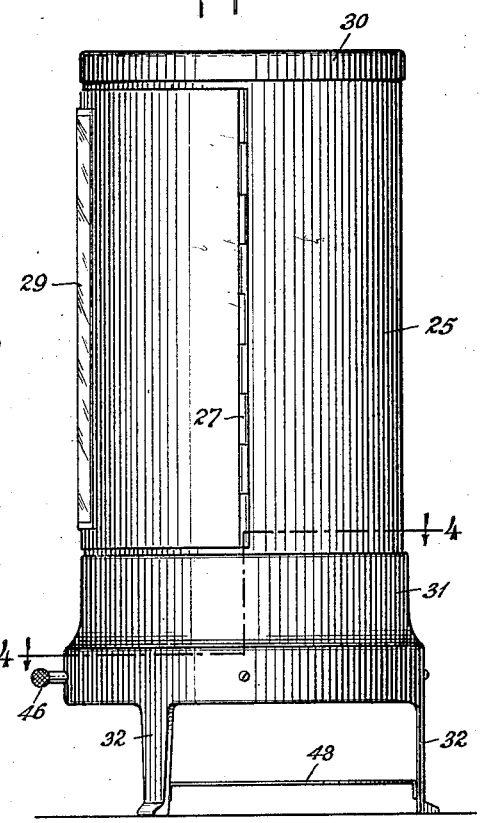
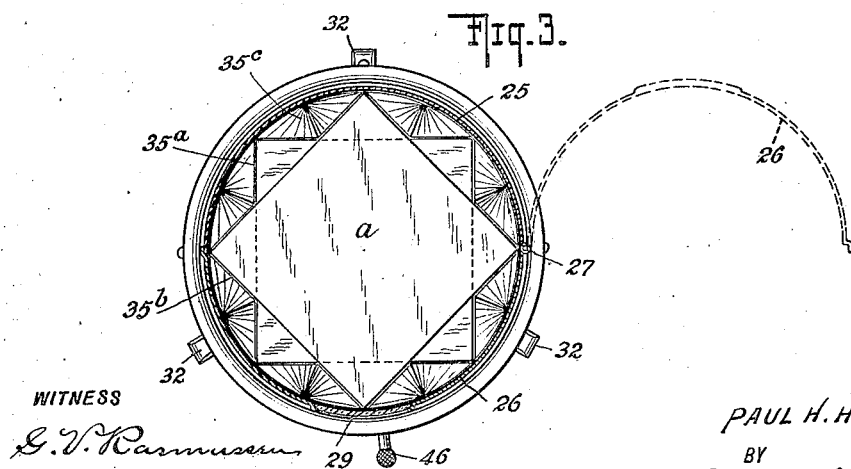
INVENTOR
PAUL H. HORWITT

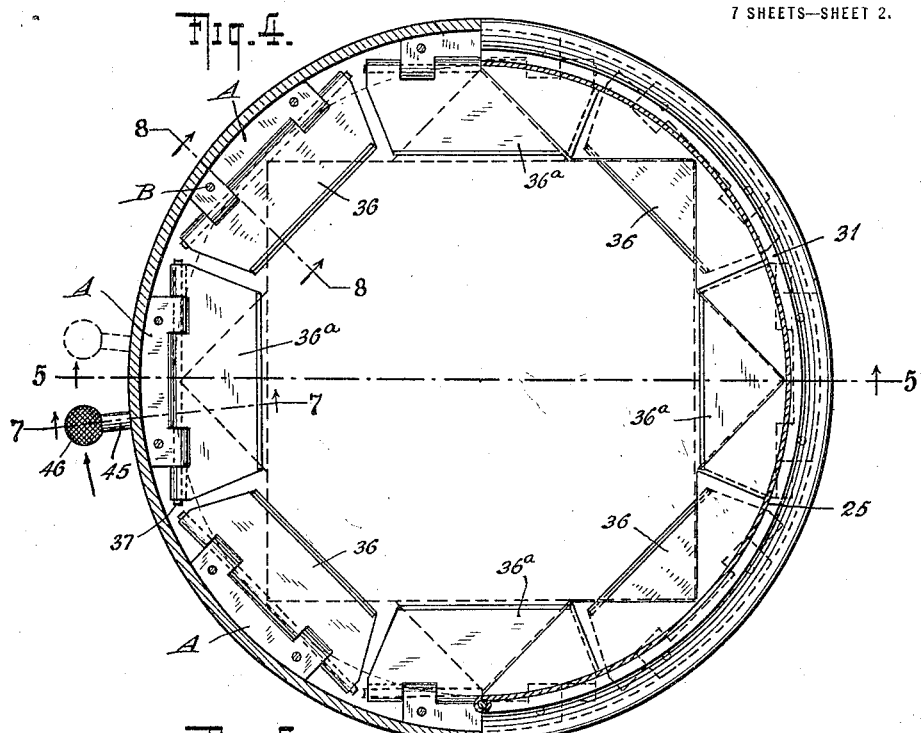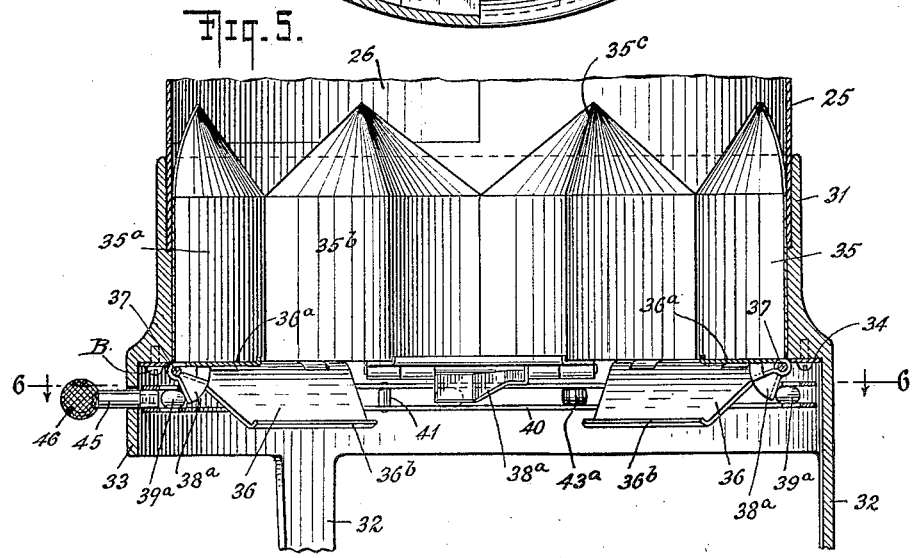

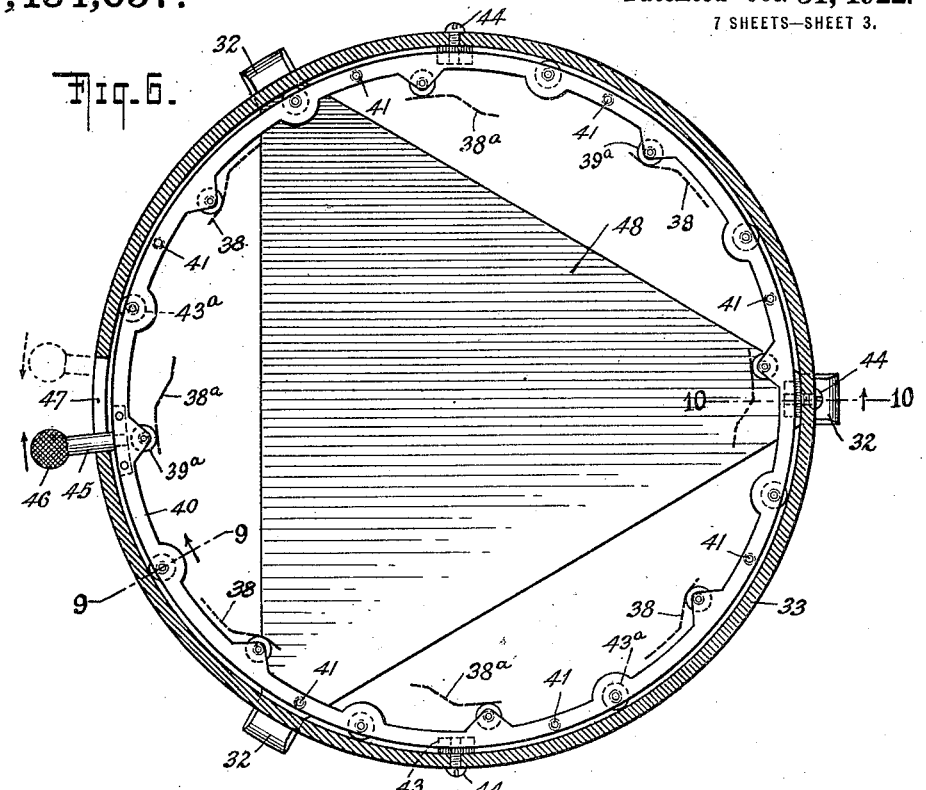
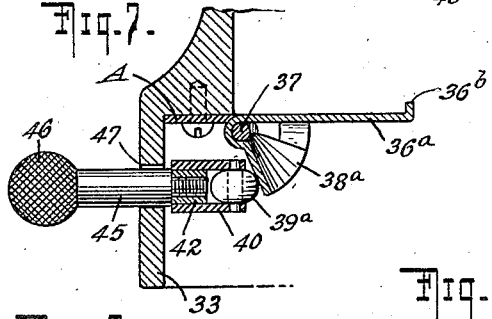
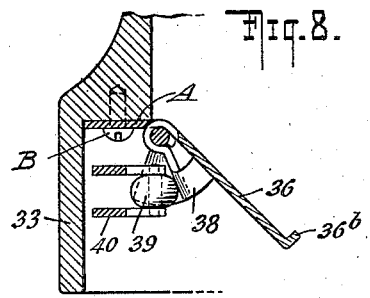
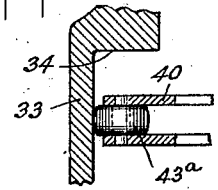
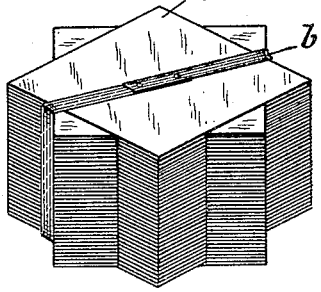
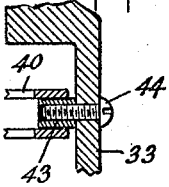

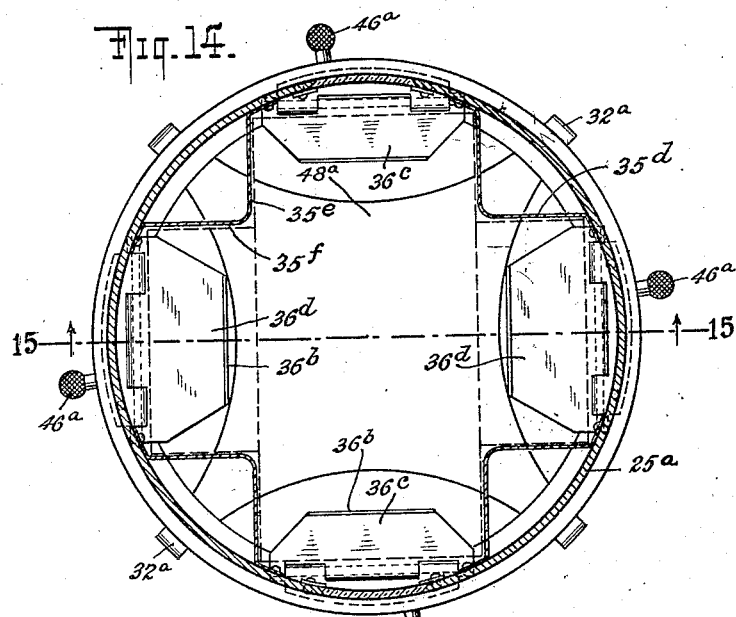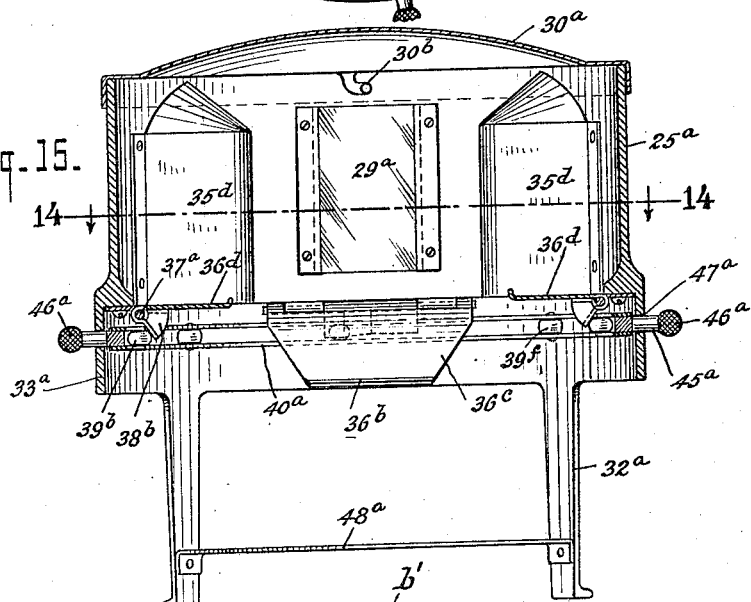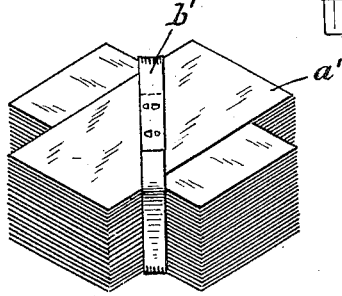

P. H. HORWITT.
DISPENSING APPARATUS.
APPLICATION FILED FEB. 4, 1922.
1,434,057.
Patented Oct. 31, 1922.
7 SHEETS—SHEET 6.
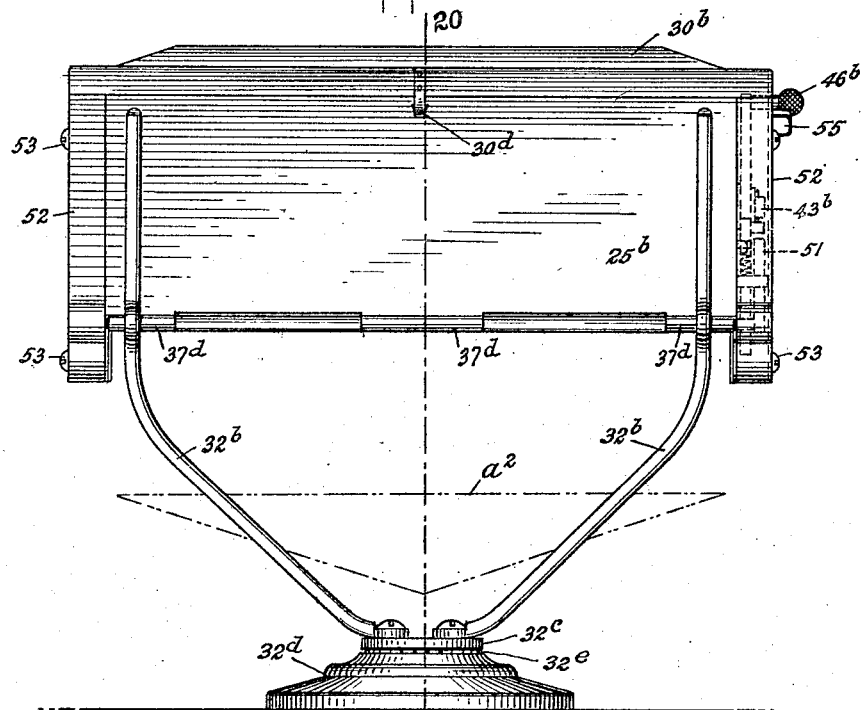
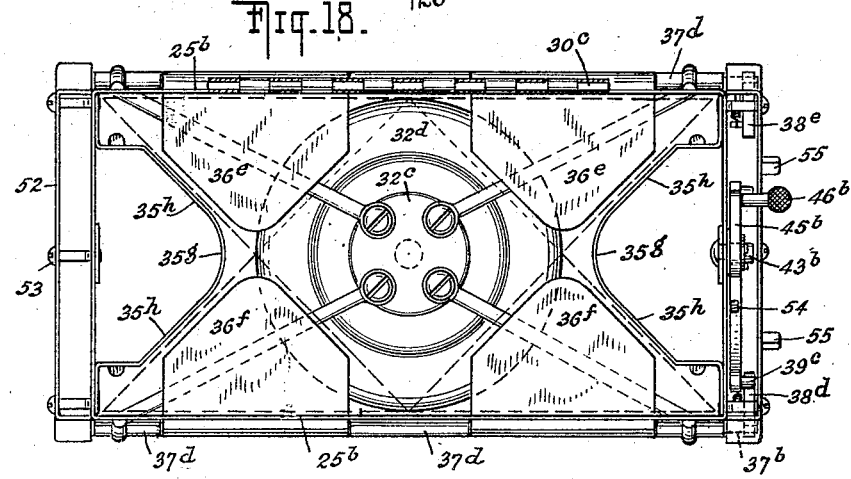
WITNESS
G. V. Rasmussen
INVENTOR
PAUL H. HORWITT
BY
Briesen Schrenk
ATTORNEYS

P. H. HORWITT.
DISPENSING APPARATUS.
APPLICATION FILED FEB. 4, 1922.

1,434,057.   Patented Oct. 31, 1922.
7 SHEETS—SHEET 7.

WITNESS
G. V. Rasmussen

INVENTOR
PAUL H. HORWITT
BY
Briesen Schrenk
ATTORNEYS

Patented Oct. 31, 1922.

1,434,057

UNITED STATES PATENT OFFICE.

PAUL H. HORWITT, OF BROOKLYN, NEW YORK, ASSIGNOR TO SIMPLEX PAPER ACCESSORIES CO., OF BROOKLYN, NEW YORK, A CORPORATION OF NEW YORK.

DISPENSING APPARATUS.

Application filed February 4, 1922. Serial No. 534,070.

*To all whom it may concern:*

Be it known that I, PAUL H. HORWITT, a citizen of the United States of America, and a resident of the borough of Brooklyn, county of Kings, city and State of New York, have invented certain new and useful Improvements in Dispensing Apparatus, of which the following is a specification.

My invention relates to dispensing apparatus and has for its object to provide a novel device whereby paper napkins may be individually dispensed at will when required for use and without subjecting the napkins to handling by others prior thereto. A further object of the invention is to so construct the apparatus as to permit napkins folded in a distinctive manner by means of suitable machinery to be readily placed in the apparatus in proper position to be dispensed thereby. Other more specific objects of the invention will appear from the description hereinafter and the features of novelty will be pointed out in the appended claims.

Figure 12:
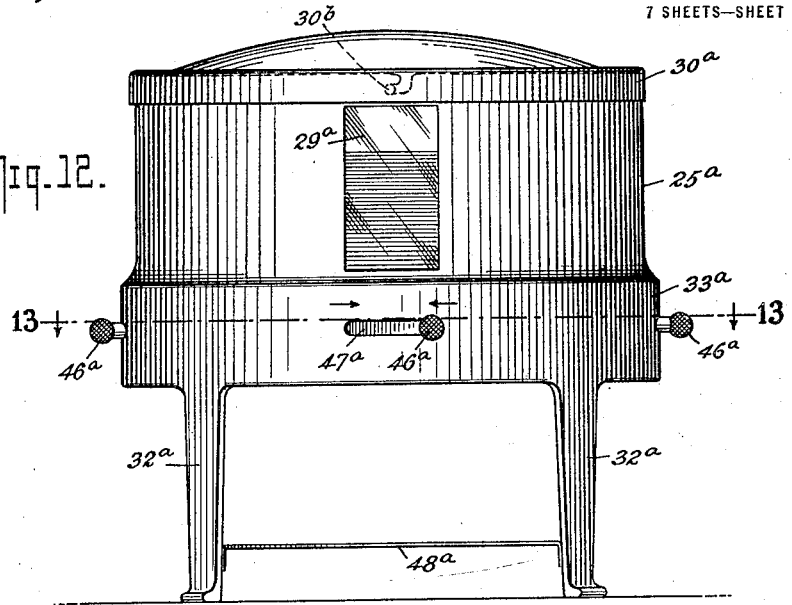
Figure 13:
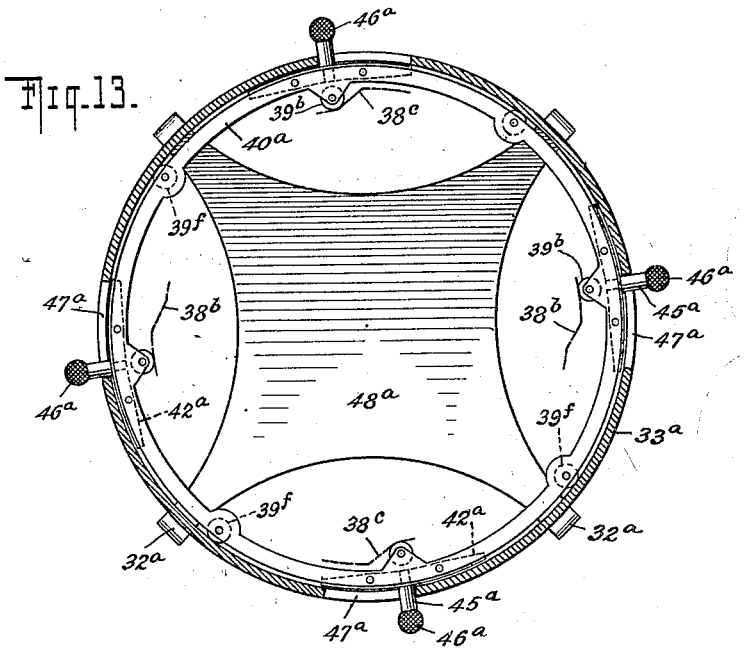
Figure 19:
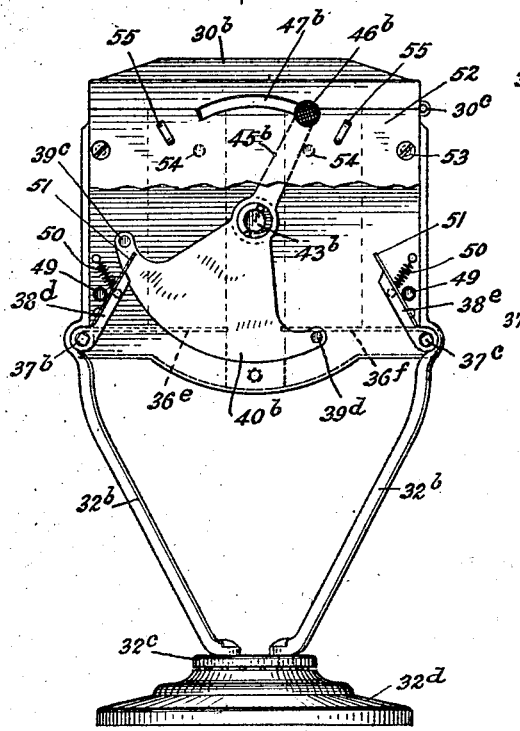
Figure 20:
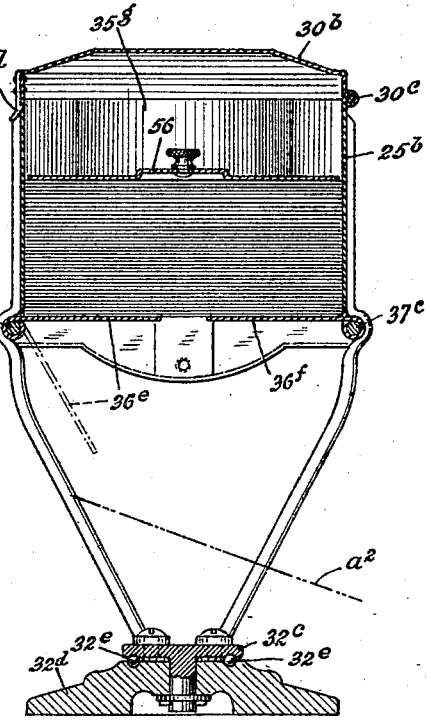
Figure 21:
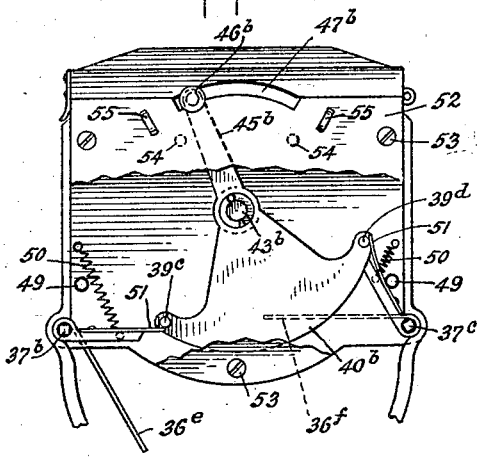
Figure 22:
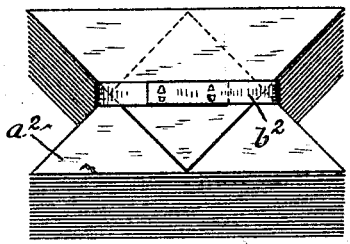

In the accompanying drawings, which show several examples of the invention without defining its limits, Figures 1 and 2 are elevations, looking at approximately right angles to each other, of one form of the apparatus; Fig. 3 is a horizontal section on the line 3—3 of Fig. 1; Fig. 4 is a horizontal section on an enlarged scale taken on the line 4—4 of Fig. 2; Fig. 5 is a fragmentary sectional view on the line 5—5 of Fig. 4; Fig. 6 is a horizontal section on the line 6—6 of Fig. 5; Figs. 7 and 8 are detail fragmentary sections on the lines 7—7 and 8—8, respectively, of Fig. 4; Figs. 9 and 10 are similar views on the lines 9—9 and 10—10, respectively, of Fig. 6; Fig. 11 is a perspective view of a package of napkins as utilized in connection with this form of the apparatus; Fig. 12 is an elevation of another form of the invention; Fig. 13 is a horizontal section thereof on the line 13—13 of Fig. 12; Fig. 14 is a similar view on the line 14—14 of Fig. 15; Fig. 15 is a vertical section on the line 15—15 of Fig. 14; Fig. 16 is a perspective view illustrating a package of napkins as used with this second form of apparatus; Fig. 17 is an elevation of still another form of the invention; Fig. 18 is a plan view with the cover removed; Fig. 19 is an end elevation; Fig. 20 is a vertical section on the line 20—20 of Fig. 17; Fig. 21 is a fragmentary end view showing the parts in a different position, and Fig. 22 is a perspective view illustrating a package of napkins as used in this form of apparatus.

In the form shown in Figs. 1 to 11 inclusive, the apparatus comprises a container 25, which is of any suitable cross-sectional form and preferably of the cylindrical form illustrated, and is of predetermined height and provided with a door 26 hinged at 27 and maintained in its closed position in any suitable manner, as by means of a catch or lock 28. The container 25 is preferably provided with a sight 29 which extends lengthwise thereof and which may be closed by means of a plate of glass or other transparent material to render the interior of the container visible without permitting dirt or other foreign material to enter the same. the upper end of the container 25 is closed by means of a cover 30, which may be permanently fixed in position, hinged or removable, as desired. The container fits into and is supported by means of a cylindrical casting 31 which is properly recessed to receive said container so that it will lie flush with the interior surface of said casting, as shown in Fig. 5. The casting in turn, is supported upon legs 32 and is provided with a depending annular flange 33 so located as to form a horizontal shoulder 34, as shown in Fig. 5. A plurality of guiding devices 35 are located within the casting 31 and are of triangular shape with the apices pointing inwardly toward the centre of the casting to form angular guideways 35ª and 35ᵇ; the guiding devices are so arranged within the casting 31 as to locate the angular guides 35ª in spaced relation to each other to form the corners of an imaginary rectangle and to position the angular guideways 35ᵇ in a manner to form the corners of another imaginary rectangle diagonally located with respect to the first-mentioned imaginary rectangle, as shown in Fig. 3. The upper ends of the guiding devices 35 each taper upwardly, as indicated at 35ᶜ, so that the guideways 35ª and 35ᵇ are provided with flaring inlet ends, as shown in Fig. 5, whereby the napkins, to be referred to more particularly hereinafter, are automatically guided into the proper guideways, in accordance with the position occupied by said napkins. A plurality of controlling members in the form of trap-doors 36 and 36ᵃ are each hinged at 37 to a hinge member A fastened to the annular horizontal shoulder 34 in any suitable manner, as by means of screws B. The trap-doors are located in predetermined groups of four so as to extend beneath the lower or delivery ends of the angular guideways 35ᵃ and 35ᵇ respectively; that is to say, the doors 36, which constitute one group, in their closed position project beneath the lower ends of the angular guideways 35ᵃ while the doors 36ᵃ, which represent another group, similarly extend beneath the lower ends of the angular guideways 35ᵇ, as shown in Fig. 4. In the preferred construction, the doors 36 and 36ᵃ are each provided at their free ends with flanges 36ᵇ, the purpose of which will appear more fully hereinafter, and are further provided with cam members 38 and 38ᵃ, respectively; the latter, as shown in Figs. 7 and 8, may comprise integral continuations of the trap-doors, so shaped as to perform their intended functions and also to provide for the accommodation of the pivots 37. These cam members 38 and 38ᵃ are located in co-operative relation to and bearing against rollers 39 and 39ᵃ, respectively, the latter being located at the proper points upon an annular actuating member 40 which consists of vertically-spaced rings maintained in their spaced relation by means of distance pieces 41 and one or more blocks 42. The annular actuating member 40 is rotatably mounted within the depending flange 33 and is maintained in its intended position in any suitable manner, as by means of lugs 43 extending inwardly from the flange 33 into the space between the two rings of said actuating device 40 and rigidly secured to said flange in any suitable manner, as by means of screws 44; to maintain the member 40 in its rotative path, it may carry rollers 43ᵃ, which bear against the flange 33. An operating member 45 terminating in a head 46 is screw-threaded into a block 42, as shown in Fig. 7, and projects radially outward therefrom through a slot 47 formed in the annular flange 33. In the preferred construction, a receiving shelf or table 48 is secured between the supporting legs 32, as shown in Figs. 1, 2 and 6.

As shown in Fig. 11, the napkins a intended for use with the form of the invention so far described are rectangular in form, or are folded in a manner to form rectangles, and are arranged in packages consisting of a predetermined number of napkins in which alternate napkins are arranged diagonally with respect to each other and are preferably tied together in such relation by means of a band b of paper or the like.

In practice, the door 26 of the container 25 is opened to the position indicated by dotted lines in Fig. 3 to permit the introduction of one or more packages of napkins a, the packages being handled by means of the band b and being placed in the container 25 in such a manner that the projecting corners of the lowermost napkins will fit into the angular guideways 35ᵃ and 35ᵇ, as shown in Fig. 3; the napkins which are above the ends 35ᶜ of the guiding devices will, as previously stated, automatically be caused to enter the said guideways because of the flaring form of the inlet ends thereof. After a package of napkins has been introduced into the container, the band b is ruptured and removed and additional packages are superimposed upon the first package and upon each other until the machine is fully loaded; the quantity of napkins remaining in a given machine during use thereof may always be ascertained through the sight 29. After the apparatus has been loaded in the manner described, the door 26 is closed, and if desired, locked by means of a suitable lock; in this condition of the parts, the lowermost napkin will be supported by means of its corners upon that group of doors 36 or 36ᵃ, which happens to be in a closed position; in Fig. 4, the doors 36ᵃ are closed, while the doors 36 are in their open position. If a napkin is now desired, the member 45 is shifted by means of its head 46 from the full line position in Figs. 4 and 6 to the dotted line position therein, thereby bringing about a corresponding partial rotation of the annular actuating member 40, which causes the rollers 39 to act upon the cam members 38 in a manner to close the group of doors 36 while at the same time the rollers 39ᵃ co-operating with the cams 38ᵃ will permit the group of trap-doors 36ᵃ to drop by gravity to an open position; the closed and open positions assumed by the doors are indicated, respectively, in Figs. 7 and 8. As the doors 36ᵃ drop to the open position, the corners of the lowermost napkin a will no longer be supported thereby, and consequently the said lowermost napkin will drop upon the shelf 48, from which it may be readily removed for use. At the same time, because of the fact that the doors 36 now occupy a closed position, the next succeeding napkin a which now becomes the lowermost one, will be supported at its corners by the doors 36 and will thereby be prevented from dropping from the apparatus and will serve to support the column of napkins in said container. As the member 45 is shifted back to the full line position of Figs. 4 and 6, the annular actuating member 40 will be rotated in the reverse direction and will cause the rollers 39ᵃ, co-operating with the cams 38ᵃ, to restore the group of doors 36ᵃ to the closed position shown in Fig. 7, while at the same time, the rollers 39 co-operating with the cams 38, will permit the group of doors 36 to drop to the open position shown in Fig. 8, whereupon the next succeeding napkin $a$ is permitted to drop upon the shelf 48$^a$, while the following napkin and the column of napkins above the same is again held in place by the doors 36$^a$. Thus, by reciprocating the annular actuating member 40 through the medium of the member 45 in the manner described, individual napkins may readily be freed from the apparatus into a position of ready accessibility for use. The operation of the machine, in so far as the dispensing of the napkins is concerned, is entirely automatic and the napkins cannot be touched and do not need to be handled by human hands until they are released from the container by the individual for immediate use. If the napkins are arranged in the form of the package shown in Fig. 11 by machinery, and if the packages are introduced into the container by means of the bands $b$, it will readily be seen that such napkins are not handled by human hands previous to use and are handled only by the person actually intending to use the individual napkins. Uncontaminated and sanitary napkins are therefore assured to the user when such napkins are dispensed by the apparatus so far described.

The form of apparatus illustrated in Figs. 1 to 11 inclusive is primarily intended to be made in relatively large sizes and to contain a relatively large supply of napkins and to be placed in a location, for instance in a restaurant, accessible to all of its patrons; it will, of course, be understood that this is not necessary to the successful operation of the apparatus and that the indicated form thereof may be made in small sizes, if desired.

In Figs. 12 to 16 inclusive, the device is made in a form intended to be placed upon tables for use by individuals at such tables, said apparatus being accordingly of somewhat smaller dimensions than the one previously described. As shown in Fig. 16, the napkins $a'$ are folded in an oblong form and so that alternate napkins cross each other at right angles, the package being secured by means of a band $b'$ of paper or the like in the same manner as previously described. These napkins are placed in a container 25$^a$ through the upper open end thereof, which is normally closed by means of a removable cover 30$^a$ secured in place in any suitable manner, as by means of a bayonet joint 30$^b$. The container, as shown, is supported upon legs 32$^a$, and may also be provided with a transparent sight 29$^a$ through which the contents may be noted. In this form, four guiding devices 35$^d$ are located within the container 25$^a$ in a manner to form guideways 35$^e$ and 35$^f$ arranged in co-operating pairs at right angles to each other, as shown in Fig. 14. Controlling members in the form of doors 36$^c$ and 36$^d$ similar to the doors previously mentioned and hinged at 37$^a$ are located in co-operating pairs or groups of two beneath the lower delivery ends of the guideways 35$^e$ and 35$^f$ respectively. Said doors may also be provided at their free ends with flanges 36$^b$. The doors 36$^c$ and 36$^d$ are provided with cams 38$^b$ and 38$^c$ similar to the cams 38 and 38$^a$ previously mentioned, and likewise co-operating with rollers 39$^b$ carried by an annular actuating member 40$^a$. This actuating member 40$^a$ is rotatably mounted within an annular flange 33$^a$ corresponding to the flange 33, and is provided at points spaced apart a distance of approximately ninety degrees with actuating members 45$^a$ terminating in heads 46$^a$ and projecting through slots 47$^a$ formed in the flange 33$^a$. The member 40$^a$ may also be provided at intervals with rollers 39$^f$ which correspond to the rollers 43$^a$ of the form first described, and by bearing against the flange 33$^a$, likewise maintain said member 40$^a$ in its rotative path.

By reciprocating the annular actuating member 40$^a$ through the medium of any one of the actuating members 45$^a$, the doors 36$^c$ and 36$^d$ will be alternately opened and closed by means of the rollers 39$^b$ and cams 38$^b$ in the manner previously described to release the lowermost napkin $a'$ and permit it to drop upon a shelf 48$^a$, corresponding to the previously mentioned shelf 48. By providing the plurality of actuating members 45$^a$, it is possible to manipulate the apparatus from all sides of the table upon which it is located without requiring the said apparatus to be shifted about. The construction and operation of this form of the invention may otherwise be the same as previously described.

The flanges 36$^b$ of the various doors in the forms so far described, serve to stretch the lowermost napkin or to place the same under tension, thus increasing the rigidity of the support for the superimposed napkins, this stretching and tensioning of the napkin by means of said flanges being due to the fact that said flanges find a purchase in the crinkled or roughened surface of the lowermost napkin.

The form of apparatus shown in Figs. 17 to 21 inclusive is also preferably of such dimensions as to adapt it specially for use on tables and is primarily intended for dispensing napkins folded in triangular form, as shown in Fig. 22. This form of apparatus accordingly includes a container 25$^b$ of generally rectangular form and provided with a cover 30$^b$ which, in this instance, may be hinged as indicated at 30$^c$ and detachably locked in its closed position by means of a suitable catch 30$^d$. The container 25$^b$ may also be mounted upon legs 32$^b$ which are preferably supported upon a disk 32$^c$ which, in turn, is rotatably fixed upon a base $32^d$; in order to reduce the friction between the parts to a minimum, ball bearings $32^e$ may be located between the disk $32^c$ and base $32^d$, any suitable means being provided for maintaining them in their intended location. With this arrangement, the apparatus is capable of being rotated about a vertical axis for the purpose to be more clearly set forth hereinafter. At its opposite ends, the receptacle $25^b$ is provided with interior guiding devices $35^g$ having guiding surfaces $35^h$ inclined at angles corresponding to the angles of the side edges of the folded napkins, as shown in Fig. 18. In the form now being described, trap-doors $36^e$ and $36^f$ are located in cooperating pairs or groups at opposite side edges of the container and are carried upon shafts $37^b$ and $37^c$, which in turn are journalled in suitable bearings $37^d$ forming part of or secured to the container $25^b$. The arrangement is such that the doors $36^e$ and $36^f$ project inwardly toward each other in opposed groups and converge toward their free ends along lines corresponding to the angles of the previously mentioned side edges of the folded napkins, as also shown in Fig. 18. The shafts $37^b$ and $37^c$, at least at one end, extend beyond the bearings $37^d$ and carry members $38^d$ and $38^e$, respectively, which may be said to correspond to the cams 38, $38^a$, $38^b$ and $38^c$ included in the forms previously described. The members $38^d$ and $38^e$ are normally maintained in position against stationary stops 49 by means of springs 50, said stops projecting from an end wall of the container $25^b$, as shown in Fig. 19. In the preferred arrangement, the members $38^d$ and $38^e$ are provided with flexible tongues 51 which project beyond the ends thereof, as shown in Fig. 19, for the purpose to be more fully described hereinafter. The form of apparatus now being described further includes an actuating member $40^b$ pivoted at $43^b$ upon the previously mentioned end wall of the container and is provided with pins $39^c$ and $39^d$, as illustrated also in Fig. 19. The actuating member $40^b$ is continued in the form of a member $45^b$, which terminates in a head $46^b$ and corresponds in function to the members 45 and $45^a$ hereinbefore referred to. In order that the actuating mechanism may be protected and enclosed, the container is provided with a flanged covering plate 52 secured in place by means of screws 53 to completely cover the actuating mechanism described. In such case, a slot $47^b$ is provided in the plate 52 for the accommodation of the headed stud $46^b$ of the member $45^b$. Suitable stops 54 are provided for arresting the movements of the member $45^b$ and in addition, finger pieces 55 are preferably provided on the plate 52 in the manner indicated in Figs. 19 and 20.

In the normal position of the parts indicated in Figs. 17 to 20 inclusive, the members $38^d$ and $38^e$ are held against stops 49 and the groups of doors $36^e$ and $36^f$ occupy horizontal closed positions, as shown best in Fig. 20. The napkins $a^2$ used with this form of the apparatus, as previously stated, are folded in triangular form and are packed in predetermined numbers and secured in such package by means of a band $b^2$, as shown in Fig. 22. A package of such napkin is introduced into the container by means of a band $b^2$, in the same way as previously described with respect to the other forms of the invention hereinbefore referred to, so as to rest upon the doors $36^e$ and $36^f$. It will be understood that the band $b^2$ is ruptured and removed, as in the previous forms, and further, that if desired or found necessary, a suitable weight 56 may be superimposed upon the supply of napkins in the container $25^b$ to exert a downward force thereon; this weight or its equivalent may, if desired, be used also in the forms first described. When in position in the container, the napkins occupy the position indicated by dotted lines in Fig. 18, it being understood that the lowermost napkin rests, for instance, upon the group of doors $36^e$ by which it is held in the apparatus, and that the next successive napkin is in a reversed position and in line with the doors $36^f$, this arrangement being followed out throughout the supply of napkins; that is to say, each alternate napkin registers with one or the other of said groups of doors $36^e$ or $36^f$. When a napkin is desired in this form of apparatus, the container is rotated upon the bearings $32^e$ to bring that end of the container at which the actuating mechanism is located within reach of the person desiring the napkin. Assuming the parts to be in the position shown in Fig. 19, the head $46^b$ is then swung toward the left; to prevent rotation of the container while this adjustment of the head $46^b$ is being effected, the thumb of the person desiring the napkin may be pressed against the left-hand finger piece 55 to exert a pressure counter to that being exerted upon the head $46^b$ and thus to hold the container in position against rotation. As the head $46^b$ is moved to the left in the indicated manner, the member $46^b$ will be correspondingly actuated while the actuating member $40^b$ will be co-incidentally swung toward the right in Fig. 19. This will bring the pin $39^c$ into engagement with the flexible tongue 51 of the member $38^d$, and will accordingly swing said member downwardly against the tension of its spring 50, which causes the group of doors $36^e$ to be moved downwardly to an open position, indicated in Fig. 1. The lowermost napkin is thereby released and is dropped by gravity to the position indicated, for instance, by dotted lines in Figs. 17 and 20; in this position, the napkin is free to be removed by the person desiring the same. As the movement of the head 46$^b$ toward the left is continued from the position shown in Fig. 21, the pin 39$^c$ will flex the tongue 51 and finally pass beyond the same, whereupon the doors 36$^e$ will immediately be returned to their closed position by means of the co-operating spring 50 which, at the same time, restores the member 38$^d$ to its normal position. During the described actuation of the parts, the pin 39$^d$ will finally engage the tongue 51 of the member 38$^e$ and will flex the same in the manner indicated in Fig. 21 and finally will pass beyond the same to a position corresponding to that occupied by the pin 39$^c$ with respect to the tongue 51 of the member 38$^d$ in Fig. 19. At this stage, the lowermost napkin is supported upon the group of doors 36$^f$ so that if the head 46$^b$ is moved back toward the right, the pin 39$^d$ will actuate the member 38$^e$ and the doors 36$^f$ in the manner previously described, and thereby will release the napkin which is supported by said group of doors 36$^f$ and permit said napkin to drop to the position shown by dotted lines in Figs. 17 and 20. Thus, by simply rocking the member 45$^b$ and actuating member 40$^b$ alternately to the right and left by means of the head 46$^b$, individual napkins in such succession as may be desired or required may readily be dispensed by the apparatus.

In all forms of the invention, including those illustrated and described, the apparatus includes controlling members which, for convenience of description, have been referred to as trap-doors and which are arranged in predetermined groups to support and release alternate napkins, as such napkins reach the bottom of the supply or, in other words, become the lowermost terminal napkins of the package or packages located in said container. These controlling members are actuated in such predetermined groups in a predetermined manner by means of suitable actuating mechanism, for instance of the type hereinbefore described; the groups of controlling members may all be coincidentally operated in a manner to bring one group to an operative or closed position while the other group is shifted to an inoperative or open position, or vice versa, or said groups may be alternately shifted to such positions. The term "operative position", as used herein, is intended to indicate that position of the doors in which the napkins are prevented from dropping from the container, while the term "inoperative position", as used herein, is intended to indicate the position of the doors in which the lowermost napkin is released and permitted to drop from said container. Thus, in the forms shown in Figs. 1 to 16 inclusive, the controlling members or trap-doors are all actuated in predetermined groups each time the annular actuating member 40 or 40$^a$ is rotatably reciprocated, while in the forms shown in Figs. 17 to 22 inclusive, the controlling members are independently and alternately operated in their predetermined groups each time the actuating member 40$^b$ is manipulated. In all of the forms, however, one group of controlling members or doors occupies an operative or closed position, while the other group of controlling members or doors occupies an inoperative or open position, so that only the lowermost terminal napkin is permitted to drop from the container, the succeeding napkins being supported on that group of doors or controlling members which, at the time, occupies the closed position.

The invention, in all of its forms, is simple in construction and efficient in operation and provides an ideal medium whereby napkins may be delivered to the user in an absolutely sanitary condition, free from contamination by the touch of human hands and in exactly the fresh, undefiled condition in which they leave the folding machine. In addition to the novel dispensing apparatus, the invention provides also novel packages of napkins, each arranged and folded in such a manner as to be particularly adapted for one or the other of the various forms of the apparatus and so as to be easily unfolded with one hand. These novel forms of packages make it possible to pack the napkins by suitable machinery, and thereby further reduce the necessity for handling of the napkins by human hands.

Various modifications in the specific forms shown and described may be made within the scope of the claims without departing from the spirit of my invention.

I claim:

1. A dispensing apparatus comprising a container for a stack of articles to be dispensed, a plurality of pivoted controlling members arranged in predetermined groups at the delivery end of said container to alternately support said articles, the pivotal axes of said members extending transversely to the delivery path of said stack, and means for shifting one group of controlling members, in a pivotal movement away from the terminus of said stack to an inoperative position to release the terminal article, the remaining articles in said container being simultaneously supported by another group of said controlling members.

2. A dispensing apparatus comprising an up-right container arranged to contain a stack of articles to be dispensed from below, a plurality of pivoted controlling members arranged in predetermined groups at the delivery end of said container to alternately support said articles, the pivotal axes of said members extending transversely to the delivery path of said stack, and actuating mechanism for shifting one group of controlling members in a downward pivotal movement to an inoperative position to release the terminal article of said stack and for coincidentally shifting another group of members in an upward pivotal movement to an operative position to support the remaining stack of articles.

3. A dispensing apparatus for paper napkins comprising a container adapted to contain a supply of such napkins, a plurality of pivoted trap-doors arranged in predetermined groups to receive and support alternate napkins, and means for actuating each group of doors to release the terminal napkin supported thereby.

4. A dispensing apparatus for paper napkins comprising a tubular container, a plurality of trap-doors aranged in predetermined groups at the delivery end of said container, an annular actuating member adapted to be rotatably reciprocated to coincidentally actuate said groups of trap-doors in predetermined relation, and means for reciprocating said annular actuating member.

5. A dispensing aparatus for paper napkins comprising a tubular container, a plurality of trap-doors arranged in groups of four at the delivery end of said container, cam members connected with said doors, an annular actuating member adapted to be rotatably reciprocated, rollers on said annular member co-operating with said cams, and means for reciprocating said annular actuating member whereby said rollers and cams are caused to operate said groups of doors in predetermined relation.

6. A dispensing apparatus for paper napkins comprising a tubular container, a plurality of doors located in groups of two at the delivery end thereof, cam members connected with said doors, an annular actuating member adapted to be rotatably reciprocated, rollers on said annular member co-operating with said cams, and means for reciprocating said annular actuating member whereby said rollers and cam members are caused to operate said groups of doors in predetermined relation.

7. A dispensing apparatus for paper napkins comprising a container for said napkins, pivoted trap-doors arranged in opposed groups of two at opposite sides of said container adjacent to the exit end thereof, members connected with said trap-doors, and pivoted actuating mechanism whereby said members are alternately operated to actuate each group of trap-doors independently of the other group to dispense said napkins in predetermined sequence.

8. A dispensing apparatus for paper napkins comprising a container adapted to contain a stack of napkins, guiding devices therein, controlling members located in predetermined groups at the delivery end of said container in registry with said guiding devices to receive and support alternate napkins, and means for operating one group of controlling members from its supporting position to release the terminal napkin and for simultaneously operating another group of said members to support the remaining napkins.

9. A dispensing apparatus for paper napkins comprising a tubular container, a plurality of trap-doors arranged in predetermined groups at the delivery end of said container, an annular actuating member adapted to be rotatably reciprocated, co-operating camming devices on said doors and annular member for coincidentally actuating said groups of trap-doors in predetermined relation to each other as said annular member is reciprocated, and means for reciprocating said annular actuating member.

In testimony whereof I have hereunto set my hand.

PAUL H. HORWITT.